i(12) United States Patent
Wassvik et al.

(10) Patent No.: US 10,496,227 B2
(45) Date of Patent: Dec. 3, 2019

(54) OPTICAL TOUCH SYSTEM COMPRISING MEANS FOR PROJECTING AND DETECTING LIGHT BEAMS ABOVE AND INSIDE A TRANSMISSIVE PANEL

(71) Applicant: FlatFrog Laboratories AB, Lund (SE)

(72) Inventors: Ola Wassvik, Ryssby (SE); Håkan Bergström, Torna-hällestad (SE); Ivan Karlsson, Lund (SE); Thomas Craven-Bartle, Södra Sandby (SE)

(73) Assignee: FlatFrog Laboratories AB, Lund (SE)

( * ) Notice: Subject to any disclaimer, the term of this patent is extended or adjusted under 35 U.S.C. 154(b) by 70 days.

(21) Appl. No.: 15/547,587

(22) PCT Filed: Feb. 9, 2016

(86) PCT No.: PCT/SE2016/050098
§ 371 (c)(1),
(2) Date: Jul. 31, 2017

(87) PCT Pub. No.: WO2016/130074
PCT Pub. Date: Aug. 18, 2016

(65) Prior Publication Data
US 2018/0267672 A1    Sep. 20, 2018

(30) Foreign Application Priority Data

Feb. 9, 2015    (SE) ..................... 1550145

(51) Int. Cl.
*G06F 3/042*    (2006.01)
*G06F 1/3231*    (2019.01)
*G06F 1/3234*    (2019.01)

(52) U.S. Cl.
CPC .......... *G06F 3/0421* (2013.01); *G06F 1/3231* (2013.01); *G06F 1/3262* (2013.01);
(Continued)

(58) Field of Classification Search
CPC .... G06F 3/0421; G06F 1/3262; G06F 1/3231; G06F 3/0428; G06F 2203/04108;
(Continued)

(56) References Cited

U.S. PATENT DOCUMENTS 3,440,426 A    4/1969 Bush
3,553,680 A    1/1971 Cooreman
(Continued)

FOREIGN PATENT DOCUMENTS

AU    2008 280 952 A1    3/2009
CN    201233592 Y    5/2009
(Continued)

OTHER PUBLICATIONS

Supplementary European Search Report for App. No. EP16749542, dated Sep. 6, 2018, in 9 pages.
(Continued)

*Primary Examiner* — Ibrahim A Khan
(74) *Attorney, Agent, or Firm* — Knobbe Martens Olson & Bear, LLP

(57) ABSTRACT

An embodiment of the invention provides a touch sensing apparatus, comprising: a light transmissive element (10) that defines a touch surface; a set of emitters (30*a*) arranged around the periphery of the touch surface to emit beams of light into the light transmissive element, wherein a first portion of the beams (50) of light propagate inside the light transmissive element while illuminating the touch surface such that an object touching the touch surface causes an attenuation of the propagating light, and wherein a second portion of the beams (90) of light pass out of the light transmissive element and are reflected to travel above the touch surface, a set of light detectors (30*b*) arranged around the periphery of the touch surface to receive light from the set of emitters from the transmissive element and from
(Continued)

above the touch surface, wherein each light detector is arranged to receive light from more than one emitter.

19 Claims, 7 Drawing Sheets

(52) U.S. Cl.
CPC .. *G06F 3/0428* (2013.01); *G06F 2203/04102* (2013.01); *G06F 2203/04104* (2013.01); *G06F 2203/04106* (2013.01); *G06F 2203/04108* (2013.01); *G06F 2203/04109* (2013.01); *Y02D 10/173* (2018.01)

(58) Field of Classification Search
CPC . G06F 2203/04106; G06F 2203/04102; G06F 2203/04109; G06F 2203/041; Y02D 10/173
See application file for complete search history.

(56) References Cited

U.S. PATENT DOCUMENTS

| | | |
|---|---|---|
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,526,422 A | 6/1996 | Keen |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,133,031 B2 | 11/2006 | Wang et al. |
| 7,176,904 B2 | 2/2007 | Satoh |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |

(56) References Cited

U.S. PATENT DOCUMENTS

| | | |
|---|---|---|
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,553,014 B2* | 10/2013 | Holmgren ............ G06F 3/0421 345/173 |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,213,445 B2 | 12/2015 | King et al. |
| 9,274,645 B2 | 3/2016 | Christiansson et al. |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1* | 11/2005 | Newton ............ G06F 3/0421 345/173 |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |

(56) References Cited

U.S. PATENT DOCUMENTS

| | | |
|---|---|---|
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0128508 A1 | 5/2009 | Sohn et al. |
| 2009/0135162 A1* | 5/2009 | Van De Wijdeven ........... G06F 3/0421 345/175 |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0238686 A1* | 9/2010 | Weber ............... G02B 6/0055 362/609 |
| 2010/0245292 A1 | 9/2010 | Wu |
| 2010/0265170 A1 | 10/2010 | Norieda |
| 2010/0277436 A1 | 11/2010 | Feng et al. |
| 2010/0277728 A1* | 11/2010 | Imura ............... G01J 3/02 356/326 |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0007021 A1* | 1/2011 | Bernstein ............... G06F 3/0416 345/174 |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1* | 3/2011 | Wassvik ............... G06F 3/0423 345/175 |
| 2011/0074735 A1 | 3/2011 | Wassvik et al. |
| 2011/0090176 A1 | 4/2011 | Christiansson et al. |
| 2011/0102320 A1* | 5/2011 | Hauke ............... G06F 3/011 345/158 |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0140106 A1* | 6/2011 | Forbes ............... H01L 31/03685 257/53 |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1 | 9/2011 | Wassvik et al. |
| 2011/0221705 A1* | 9/2011 | Yi ............... G06F 3/0425 345/175 |
| 2011/0221997 A1* | 9/2011 | Kim ............... G06F 3/0416 349/62 |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1* | 10/2011 | Song ............... G06F 3/0421 345/175 |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |

(56) References Cited

U.S. PATENT DOCUMENTS

| | | |
|---|---|---|
| 2012/0131490 A1 | 5/2012 | Lin et al. |
| 2012/0141001 A1 | 6/2012 | Zhang et al. |
| 2012/0146930 A1 | 6/2012 | Lee |
| 2012/0146950 A1* | 6/2012 | Park .................. G06F 3/0421 345/175 |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0154983 A1 | 6/2013 | Christiansson et al. |
| 2013/0155027 A1* | 6/2013 | Holmgren ............ G06F 3/0421 345/175 |
| 2013/0181896 A1 | 7/2013 | Gruhlke et al. |
| 2013/0187891 A1* | 7/2013 | Eriksson ............ G06F 3/0421 345/175 |
| 2013/0201142 A1 | 8/2013 | Suarez Rovere |
| 2013/0222346 A1 | 8/2013 | Chen et al. |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253831 A1 | 9/2014 | Craven-Bartle |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0002470 A1* | 1/2015 | Zhu .................. G06F 3/0421 345/175 |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0103051 A1* | 4/2015 | Wyrwas ............ G06F 3/0416 345/175 |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0124546 A1 | 5/2016 | Chen et al. |
| 2016/0124551 A1 | 5/2016 | Christiansson et al. |
| 2016/0154531 A1 | 6/2016 | Wall |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |

FOREIGN PATENT DOCUMENTS

| | | |
|---|---|---|
| CN | 101644854 A | 2/2010 |
| CN | 201437963 U | 4/2010 |
| CN | 101019071 B | 6/2012 |
| CN | 101206550 B | 6/2012 |
| CN | 101075168 B | 4/2014 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |

(56) References Cited

FOREIGN PATENT DOCUMENTS

| | | |
|---|---|---|
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| EP | 2778849 A1 | 9/2014 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/039006 A1 | 4/2008 |
| WO | WO 2008/068607 A2 | 6/2008 |
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/133756 A1 | 9/2013 |
| WO | WO 2013/133757 A2 | 9/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014/055809 A1 | 4/2014 |

OTHER PUBLICATIONS

Ahn, Y., et al., "A slim and wide multi-touch tabletop interface and its applications," BigComp2014, IEEE, 2014, in 6 pages.

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

Johnson, M., "Enhanced Optical Touch Input Panel", IBM Technical Discolusre Bulletin, 1985, in 3 pages.

Kak, et al., "Principles of Computerized Tomographic Imaging", Institute of Electrical Engineers, Inc., 1999, in 333 pages.

The Laser Wall, MIT, 1997, http://web.media.mit.edu/~joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages.

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

Extended European Search Report in European Application No. 19165019.1, dated Jul. 18, 2019 in 8 pages.

\* cited by examiner

OPTICAL TOUCH SYSTEM COMPRISING MEANS FOR PROJECTING AND DETECTING LIGHT BEAMS ABOVE AND INSIDE A TRANSMISSIVE PANEL

CROSS-REFERENCE TO RELATED APPLICATIONS

This application claims the benefit and priority to and is a U.S. National Phase of PCT International Application No. PCT/SE2016/050098, filed on Feb. 9, 2016. This application claims the benefit and priority to Swedish Patent Application No. 1550145-5, filed Feb. 9, 2015. The disclosure of the above-referenced applications are hereby expressly incorporated by reference in their entirety.

TECHNICAL FIELD

The present invention generally relates to improved touch determination on touch surfaces of optical touch-sensing systems, and in particular in relation to FTIR-based (frustrated total internal reflection) touch systems.

BACKGROUND ART

In one category of touch-sensitive panels known as 'above surface optical touch systems' and known from e.g. U.S. Pat. No. 4,459,476, a plurality of optical emitters and optical receivers are arranged around the periphery of a touch surface to create a grid of intersecting light paths above the touch surface. Each light path extends between a respective emitter/receiver pair. An object that touches the touch surface will block certain ones of the light paths. Based on the identity of the receivers detecting a blocked light path, a processor can determine the location of the intercept between the blocked light paths. This type of system is only capable of detecting the location of one object (single-touch detection). Further, the required number of emitters and receivers, and thus cost and complexity, increases rapidly with increasing surface area and/or spatial resolution of the touch panel.

In a variant, e.g. shown in WO2006/095320, each optical emitter emits a beam of light that diverges across the touch surface, and each beam is detected by more than one optical receiver positioned around the periphery of the touch surface. Thus, each emitter creates more than one light path across the touch surface. A large number of light paths are created by sequentially activating different emitters around the periphery of the touch surface, and detecting the light received from each emitter by a plurality of optical receivers. Thereby, it is possible to reduce the number of emitters and receivers for a given surface area or spatial resolution, or to enable simultaneous location detection of more than one touching object (multi-touch detection).

If the display screen is contaminated by e.g. fingerprints, the optical transmission path may become unintentionally interrupted and the information retrieved from the system erroneous or incomplete as the contaminated surface becomes insensitive to touches. If contaminants are collected in front of one of the emitters or detectors there will always be blocked or occluded light paths.

Another category of touch-sensitive panels known as 'in-glass optical systems' is now described and is also known from e.g. U.S. Pat. No. 8,581,884.

FIG. 1 illustrates an example of a touch-sensitive apparatus 100 that is based on the concept of FTIR (Frustrated Total Internal Reflection), also denoted "FTIR system". The apparatus operates by transmitting light inside a transmissive panel 10, from light emitters 30a to light sensors or detectors 30b, so as to illuminate a touch surface 20 from within the transmissive panel 10. The transmissive panel 10 is made of solid material in one or more layers and may have any shape. The transmissive panel 10 defines an internal radiation propagation channel, in which light propagates by internal reflections.

In the example of FIG. 1, the propagation channel is defined between the touch surface 20 and bottom surface 25 of the transmissive panel 10, where the touch surface 20 allows the propagating light to interact with touching object 60 and thereby defines the touch surface 20. This is achieved by injecting the light into the transmissive panel 10 via coupling element 40 such that the light is reflected by total internal reflection (TIR) in the touch surface 20 as it propagates through the transmissive panel 10. The light may be reflected by TIR on the bottom surface 25 or against a reflective coating thereon. Upon reaching coupling element 40 on a far side of the panel, the light is coupled out of transmissive panel 10 and onto detectors 30b. The touch-sensitive apparatus 100 may be designed to be overlaid on or integrated into a display device or monitor.

U.S. Pat. No. 8,553,014 describes an attempt to combine the above surface and in-glass optical systems described above. U.S. Pat. No. 8,553,014 describes an optical coupling technique for introducing light into a transmissive panel and above a transmissive panel simultaneously. However, the in-coupling component shown in FIG. 126 of U.S. Pat. No. 8,553,014 is a complex prism and appears to rely on total internal reflection and diffraction to couple the light above the touch surface. Such an arrangement would be highly tolerance sensitive, making the optical signal highly sensitive to, for example, the load on the touch surface, the tolerances of process used to mount the prism to the transmissive panel, and the manufacturing of both the transmissive panel and the prism. Furthermore, the spread of the light in a plane parallel to the transmissive panel is limited to a range of less than 80 degrees as light outside this range will be diffracted up and away from the panel. Such a system is best suited to a rectangular grid of detection lines, such as described in U.S. Pat. No. 4,459,476 above. Furthermore, a complex prism as described in U.S. Pat. No. 8,553,014 would be both expensive to manufacture and bulky, taking up valuable space underneath and to the side of the transmissive panel.

SUMMARY OF INVENTION

It is an objective of the invention to at least partly overcome one or more of the above-identified limitations of the prior art.

One or more of these objectives, as well as further objectives that may appear from the description below, are at least partly achieved by means of a method for data processing, a computer readable medium, devices for data processing, and a touch-sensing apparatus according to the independent claims, embodiments thereof being defined by the dependent claims.

An embodiment of the invention provides a touch sensing apparatus, comprising: a light transmissive element that defines a touch surface; a set of emitters arranged around the periphery of the touch surface to emit beams of light into the light transmissive element, wherein a first portion of the beams of light propagate inside the light transmissive element while illuminating the touch surface such that an object touching the touch surface causes an attenuation of the propagating light, and wherein a second portion of the beams of light pass out of the light transmissive element and are reflected to travel above the touch surface, a set of light detectors arranged around the periphery of the touch surface to receive light from the set of emitters from the transmissive element and from above the touch surface, wherein each light detector is arranged to receive light from more than one emitter; a processing element configured to determine, based on output signals of the light detectors, a light energy value for each light path; to generate a transmission value for each light path based on the light energy value; and to operate an image reconstruction algorithm on at least part of the thus-generated transmission values so as to determine the position of the object on the touch surface.

BRIEF DESCRIPTION OF DRAWINGS

Embodiments of the invention will now be described in more detail with reference to the accompanying schematic drawings.

DESCRIPTION OF EMBODIMENTS

Figure 1:
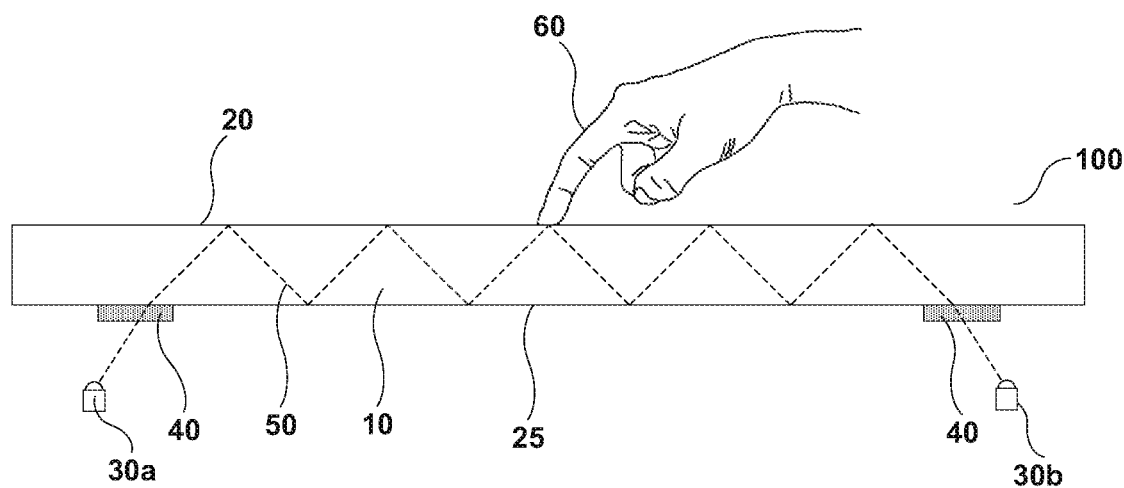
FIG. 1 shows a cross section of an FTIR-based touch-sensitive apparatus according to the prior art.

Before describing embodiments of the invention, a few definitions will be given.

A "touch object" or "touching object" is a physical object that touches, or is brought in sufficient proximity to, a touch surface so as to be detected by one or more sensors in the touch system. The physical object may be animate or inanimate.

An "interaction" occurs when the touch object affects a parameter measured by the sensor.

A "touch" denotes a point of interaction as seen in the interaction pattern.

Throughout the following description, the same reference numerals are used to identify corresponding elements.

Main Embodiment

Figure 2:
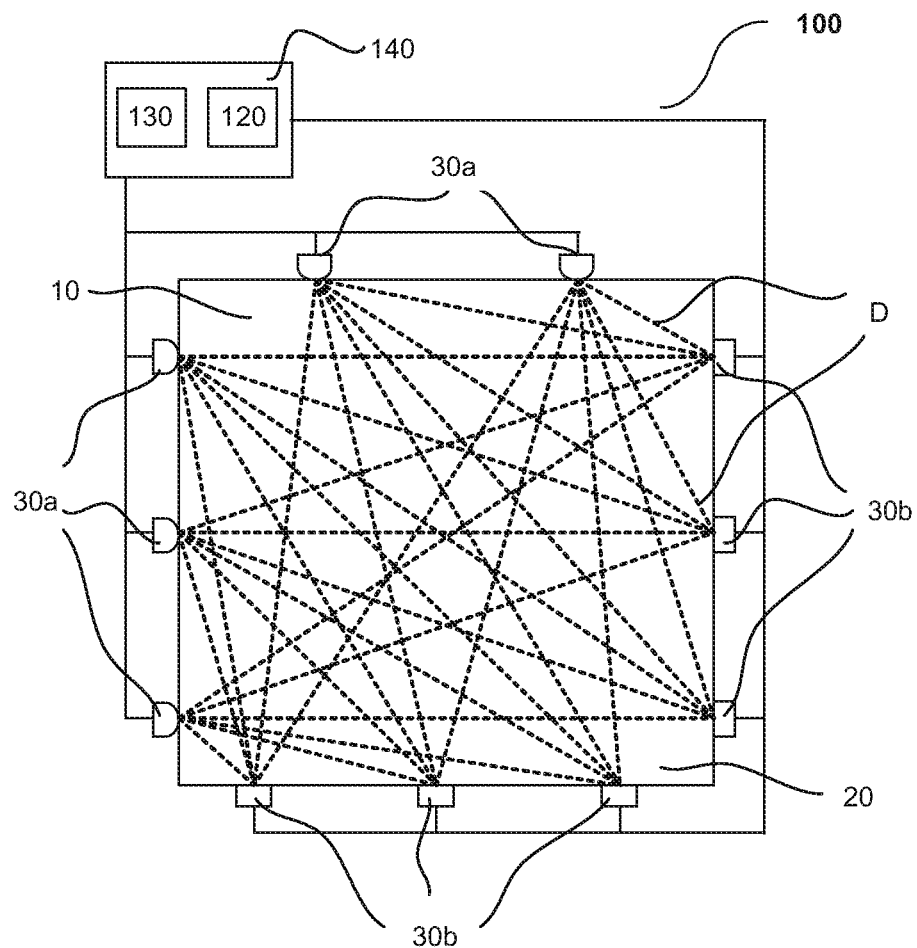
FIG. 2 is a top plan view of an FTIR-based touch-sensitive apparatus.

FIG. 2 illustrates a top plan view of FIG. 1 in an example of a touch-sensitive apparatus 100 that is based on the concept of FTIR. Emitters 30a are distributed around the periphery of touch surface 20, to project light into the transmissive panel 10 such that at least part of the light is captured inside the transmissive panel 10 for propagation by internal reflection in the propagation channel. Detectors 30b are distributed around the periphery of touch surface 20, to receive part of the propagating light. The light from each of emitters 30a will thereby propagate inside the transmissive panel 10 to a number of different detectors 30b on a plurality of light paths D.

Even if the light paths D correspond to light that propagates by internal reflections inside the panel 1, the light paths D may conceptually be represented as "detection lines" that extend across the touch surface 20 to the periphery of touch surface 20 between pairs of emitters 30a and detectors 30b, as shown in FIG. 2. Thus, the detection lines D correspond to a projection of the light paths D onto the touch surface 20. Thereby, the emitters 30a and detectors 30b collectively define a grid of detection lines D ("detection grid") on the touch surface 20, as seen in a top plan view. The spacing of intersections in the detection grid defines the spatial resolution of the touch-sensitive apparatus 100, i.e. the smallest object that can be detected on the touch surface 20. The width of the detection line is a function of the width of the emitters and corresponding detectors. A wide detector detecting light from a wide emitter provides a wide detection line with a broader surface coverage, minimising the space in between detection lines which provide no touch coverage. A disadvantage of broad detection lines may be the reduced touch precision and lower signal to noise ratio.

As used herein, the emitters 30a may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 30a may also be formed by the end of an optical fiber. The emitters 30a may generate light in any wavelength range. The following examples presume that the light is generated in the infrared (IR), i.e. at wavelengths above about 750 nm. Analogously, the detectors 30b may be any device capable of converting light (in the same wavelength range) into an electrical signal, such as a photo-detector, a CCD device, a CMOS device, etc.

The detectors 30b collectively provide an output signal, which is received and sampled by a signal processor 130. The output signal contains a number of sub-signals, also denoted "projection signals", each representing the energy of light received by one of light detectors 30b from one of light emitters 30a. Depending on implementation, the signal processor 130 may need to process the output signal for separation of the individual projection signals. The projection signals represent the received energy, intensity or power of light received by the detectors 30b on the individual detection lines D. Whenever an object touches a detection line D, the received energy on this detection line is decreased or "attenuated".

The signal processor 130 may be configured to process the projection signals so as to determine a property of the touching objects, such as a position (e.g. in a x,y coordinate system), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 20, where each attenuation value represents a local degree of light attenuation. The attenuation pattern may be further processed by the signal processor 130 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

In the illustrated example, the apparatus 100 also includes a controller 120 which is connected to selectively control the activation of the emitters 30a and, possibly, the readout of data from the detectors 30b. Depending on implementation, the emitters 30a and/or detectors 30b may be activated in sequence or concurrently, e.g. as disclosed in U.S. Pat. No. 8,581,884. The signal processor 130 and the controller 120 may be configured as separate units, or they may be incorporated in a single unit. One or both of the signal processor 130 and the controller 120 may be at least partially implemented by software executed by a processing unit 140.

Figure 3:
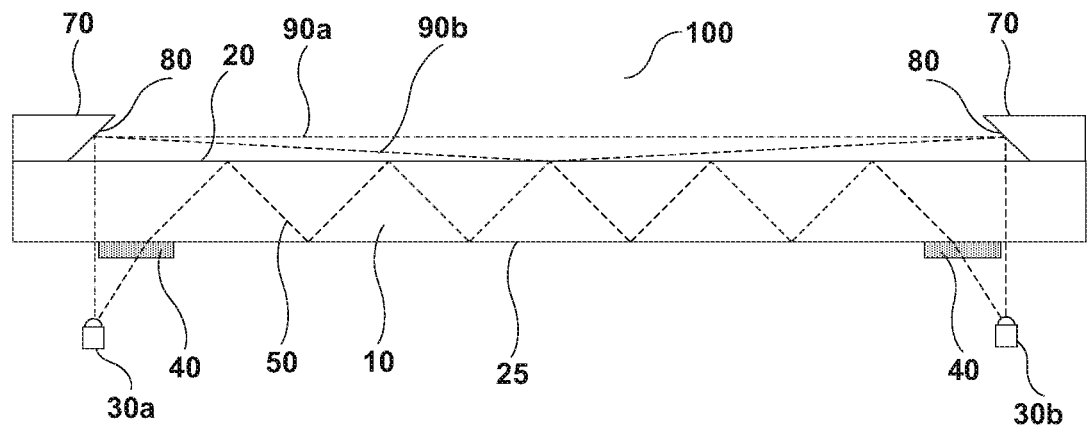
FIG. 3 shows a section view of an extended FTIR touch system according to an embodiment of the present invention.

FIG. 3 illustrates an embodiment of the invention extending the FTIR system of FIG. 1 to include touch detection lines above touch surface 20.

As with FIG. 1, FIG. 3 shows an embodiment of the invention in which light travels inside a transmissive panel 10, from light emitters 30a to detectors 30b, so as to illuminate a touch surface 20 from within the transmissive panel 10. The transmissive panel 10 is made of solid material in one or more layers and may have any shape. The transmissive panel 10 defines an internal radiation propagation channel, in which light beam 50 propagates by internal reflections. In FIG. 3, the propagation channel is defined between the touch surface 20 and bottom surface 25 of the transmissive panel 10, where the touch surface 20 allows the propagating light beam 50 to interact with touching object 60 and thereby defines the touch surface 20. This is achieved by injecting the light into the transmissive panel 10 via coupling element 40 such that the light is reflected by total internal reflection (TIR) in the touch surface 20 as it propagates through the transmissive panel 10. The light beam 50 may be reflected by TIR on the bottom surface 25 or against a reflective coating thereon. Upon reaching coupling element 40 on a far side of the panel, the light is coupled out of transmissive panel 10 and onto detectors 30b. The touch-sensitive apparatus 100 may be designed to be overlaid on or integrated into a display device or monitor.

FIG. 3 further illustrates that a portion of the light emitted by emitters 30a is transmitted through transmissive panel 10 in a manner that does not cause the light to TIR within transmissive panel 10. Instead, the light the light exits transmissive panel 10 through touch surface 20 and is reflected by reflector surface 80 of edge reflector 70 to travel along path 90a in a plane parallel with touch surface 20. The light will then continue until deflected by reflector surface 80 of the edge reflector 70 at an opposing edge of the transmissive panel 10, wherein the light will be deflected back down through transmissive panel 10 and onto detectors 30b. The feature of the transmitting the light from the emitters 30a to reflector surface 80 via transmissive panel 10 has a number of advantages over the solutions presented by the prior art. In particular, manufacture of touch-sensitive apparatus 100 becomes significantly less expensive. This feature allows an arrangement where nothing is in contact with the edges of the transmissive panel 10, allowing expensive finishing (where the transmissive panel 10 is formed from glass) to regulate the edges of the glass to be avoided. Furthermore, fastening of the components to the transmissive panel 10 is simplified and optical tolerances are improved.

Figure 4:
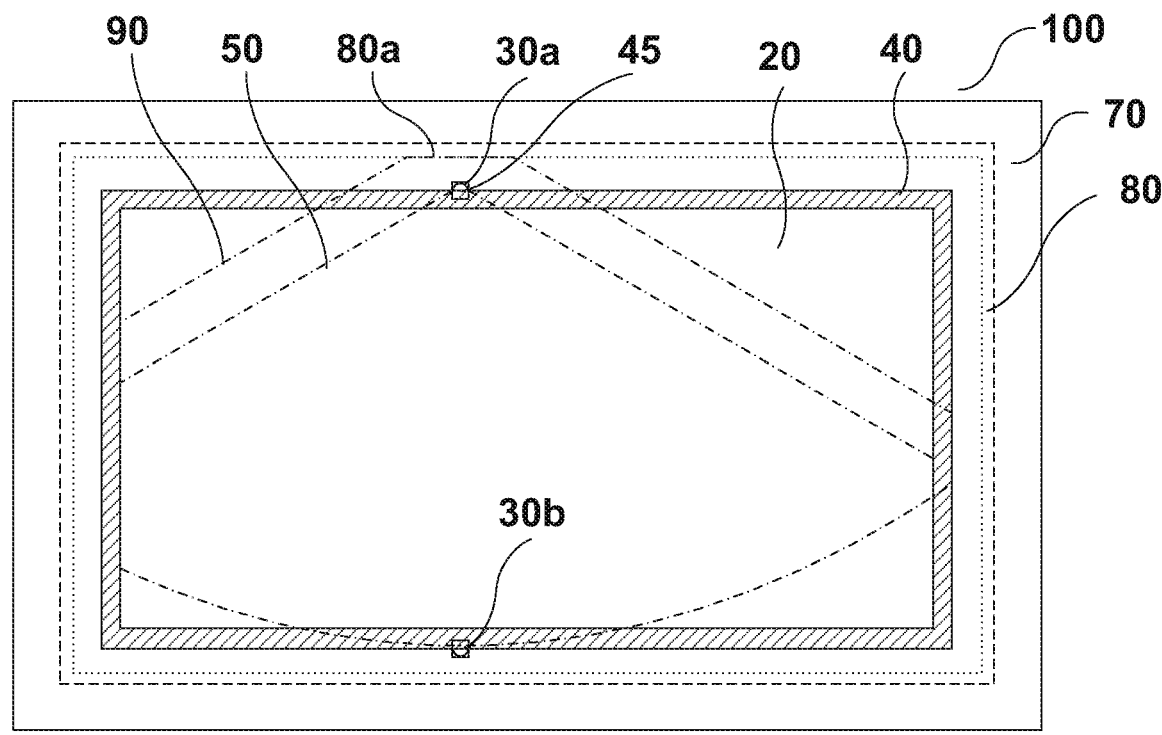
FIG. 4 shows a top plan view of an extended FTIR touch system according to an embodiment of the present invention.

FIG. 4 shows a top plan view of the embodiment of FIG. 3. As viewed from above, light beam 50 travelling through transmissive panel 10 originates from where the light is coupled into the transmissive panel 10 by coupling element 40 at in-coupling point 45. Light beam 90 travelling above touch surface 20 (along path 90a, path 90b) originates from reflector surface focal point 80a of reflector surface 80 where the light emitted from emitters 30a and having passed through transmissive panel 10 is reflected across touch surface 20. The distance travelled by the (un-collimated) light from emitters 30a to reflector surface focal point 80a is greater than the distance travelled by the light from emitters 30a to in-coupling point 45. Consequently, the spread of light reflected from the reflector surface focal point 80a is broader than the spread of light entering the transmissive panel 10 at in-coupling point 45. The resulting effect is equivalent to that of using a wider emitter for emitting the above surface light beam 90 than that of light beam 50, travelling inside the glass. A corresponding effect occurs at the detector end, wherein the light arriving at detectors 30b via the above surface route is reflected onto detectors 30b from a broader area than the area of in-coupling point 45, providing the equivalent effect of broader detectors 30b.

Figure 5:
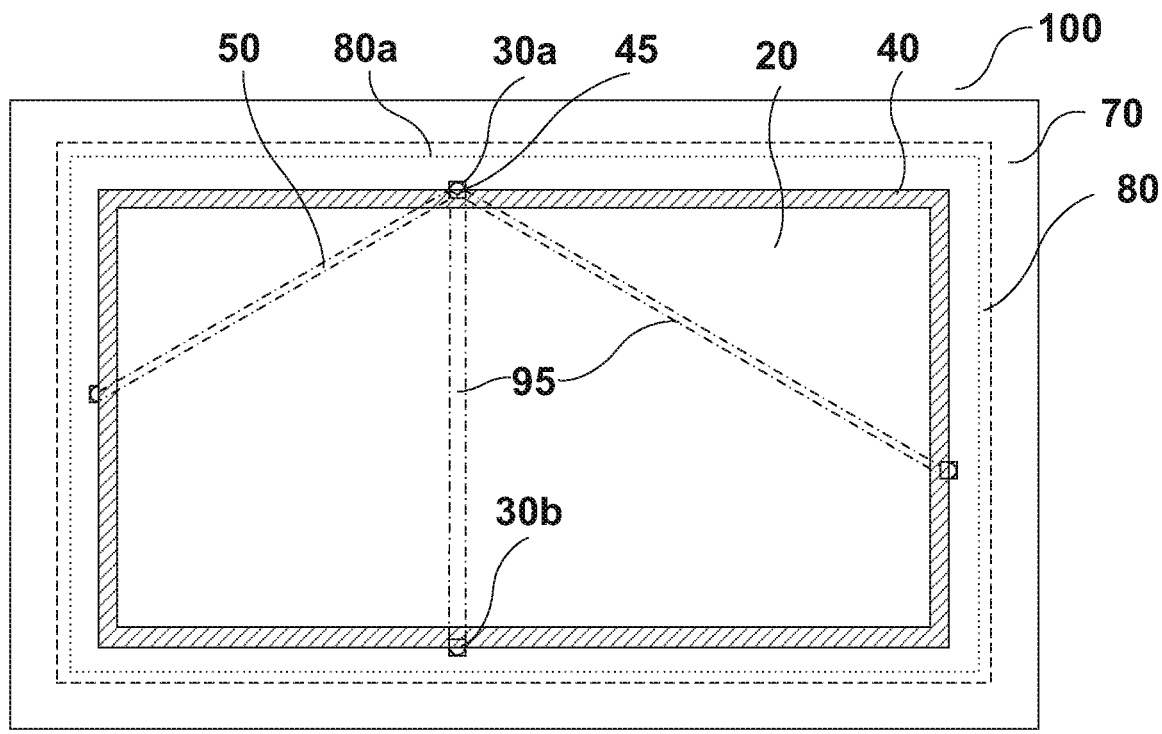
FIG. 5 shows the narrow detection lines within transmissive panel 10.
Figure 6:
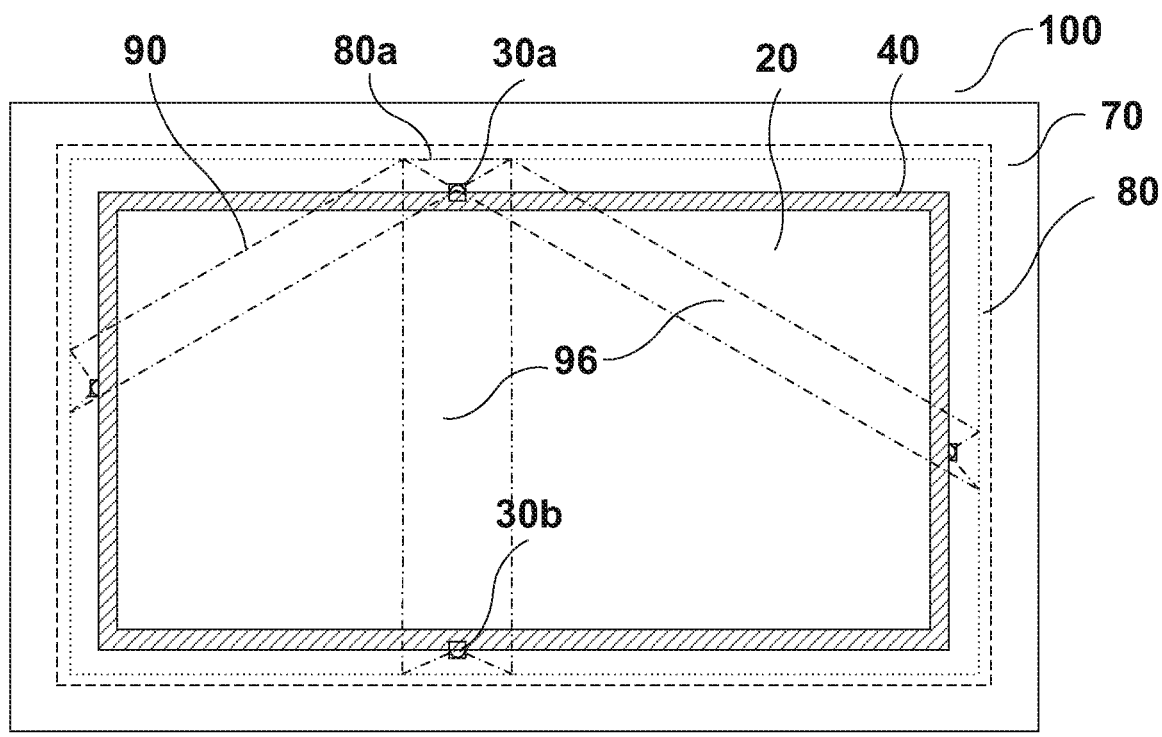
FIG. 6 shows the broad detection lines above transmissive panel 10.

The result is that detection lines derived from light beam 90 are broader than detection lines derived from light beam 50. FIG. 5 and FIG. 6 show the difference in detection lines 95 derived from the light travelling within the glass and detection lines 96 derived from light travelling above the touch surface. In FIG. 5, detection lines 95 have a width corresponding to the short distance travelled to the in-coupling point 45 from emitters 30a. In FIG. 6, detection lines 96 have a width corresponding to the extra distance travelled to reflector surface focal point 80a from emitters 30a.

A stylus and a finger may have very large differences in size (or width as viewed from the perspective of a detection line). A stylus may typically provide a width of 2 mm to 5 mm, whereas a finger may provide a width of 5 mm to 15 mm. However, the size of a decoded touch will depend on the convolution of the detection line and the object. It is preferable to have wider detection lines above the glass, both in order to provide better cover the touch surface 20 and to get a broadened stylus interaction since this may increase the resolution. However, broadening of detection lines will reduce the ability to separate two closely spaced touch objects, potentially a key requirement for multi-touch systems.

Figure 7:
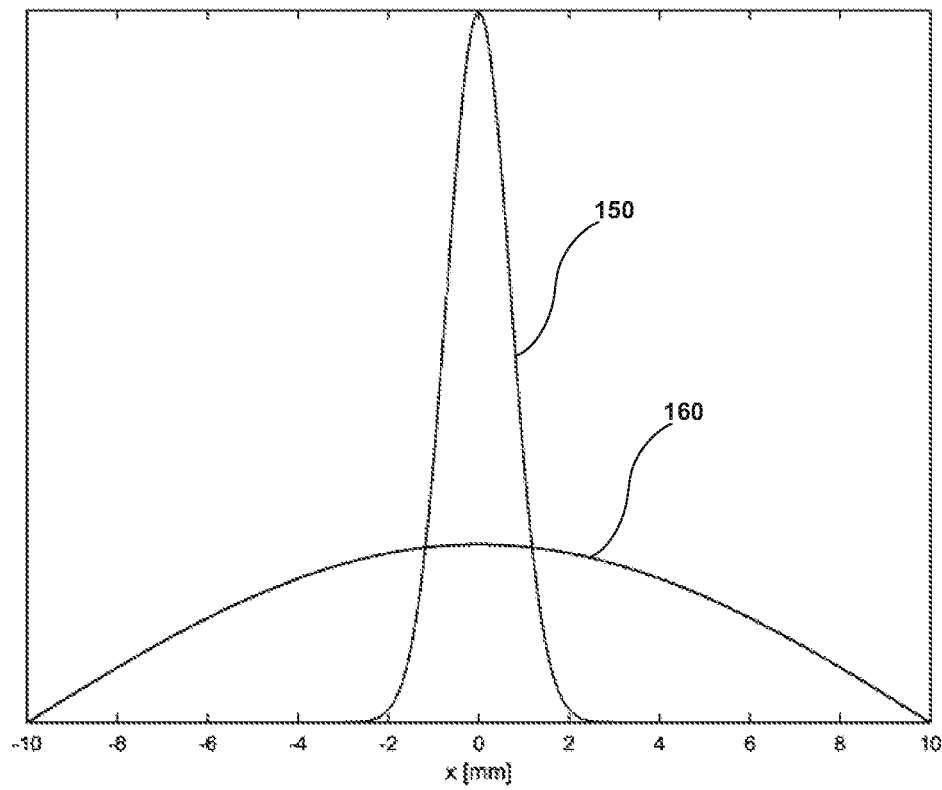
FIG. 7 shows the signal profile of detection lines 95 and detection lines 96.

Therefore, a solution with different detection line widths above and within the glass is required. FIG. 7 shows a signal profile of a narrow detection line overlaid on a wide detection line. Narrow detection lines 95 have a signal profile corresponding to signal profile 150 and wide detection lines 96 have a signal profile corresponding to signal profile 160.

Since a stylus will usually be used as a single touch object, broader detection lines are possible. Wide detection lines 96 with a width larger than 4 mm and possibly up to 20 mm are advantageous, although 4 mm-6 mm is preferred.

For narrow detection lines 95 designed to resolved multiple touching objects such as fingers, broadening must be kept down to a size less than or comparable to the touching objects. The width of narrow detection lines 95 is also usually limited by the width of emitters 30a and detectors 30b. Narrow detection lines 95 should be less than 5 mm in width. In a preferred embodiment, detection lines 95 are between 2 mm and 3 mm wide.

In one embodiment, reflector surface 80 is a diffusive reflecting surface. In a preferred embodiment, reflector surface 80 is a lambertian diffusive reflecting surface preferably providing a scattering of greater than 90%. Suitable materials for reflector surface 80 may include Titanium oxide paint or Microcellular foamed reflector MCPET. The advantage of using a diffusive reflecting surface is that it makes the optical system less sensitive to production, mounting and load tolerances than a specular reflector or lens. This allows the touch-sensitive apparatus 100 to be cheaper and simpler to produce. Furthermore, a diffusive reflector surface 80 also allows broader and overlapping detection lines.

The amount of light reflected by reflector surface 80 may be controlled by adjusting the size of reflector surface 80. A reflector surface 80 having a smaller surface area will reflect a small amount of light. Alternatively, paint or spray coatings may be selected to reduce the reflection, and may be applied in a specific pattern to the surface for accurate control of reflectivity.

In one embodiment, the amount of light received at each of detectors 30b via the in-glass route (shown in the figures as light beam 50) is greater than or equal to the amount of light received at each of detectors 30b via the above surface route (shown in the figures as light beam 90). In a preferred embodiment, the ratio of light received at each of detectors 30b via the in-glass route is ten times greater than the amount of light received at each of detectors 30b via the above surface route. This feature is advantageous as it allows the attenuation of the optical signal resulting from FTIR to be easily compared at the reconstruction phase to the attenuation of the optical signal resulting from occlusion of the above surface light, even though the latter is usually significantly larger than the former.

In the embodiment shown in FIG. 3, reflector surface 80 is configured to reflect a portion of light beam 90 to travel along path 90a and a portion of light beam 90 to travel along path 90b, by reflecting off touch surface 20 and coupling out to the detector. This advantageously results in a larger portion of light beam 90 being detected by detectors 30b. Furthermore, the use of path 90b allows load tolerances of the touch-sensitive apparatus 100 to be improved. A heavy load on touch surface 20 may deform the panel and bring path 90a out of alignment. However, path 90b would likely be less affected by said deformation, allowing sufficient signal to continue to be received by detectors 30b.

Figure 8:
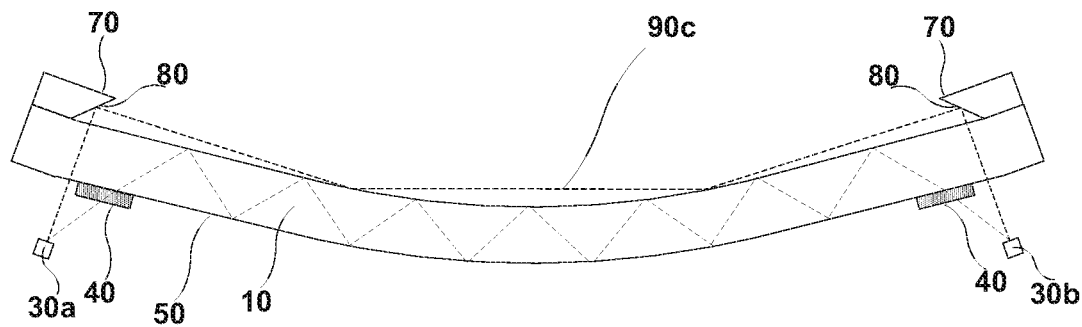
FIG. 8 shows an embodiment of the present invention in which the touch surface is curved.

In an embodiment of the invention shown in FIG. 8, transmissive panel 10 is curved to form a concave surface. In this embodiment, reflector surface 80 is configured to cause a portion of light beam 90 to reflect a plurality of times off touch surface 20 to follow a path 90c shown in FIG. 8. Similarly to the above embodiment, this feature allows a further enhancement of the signal to noise ratio, even for a curved panel.

Figure 9:
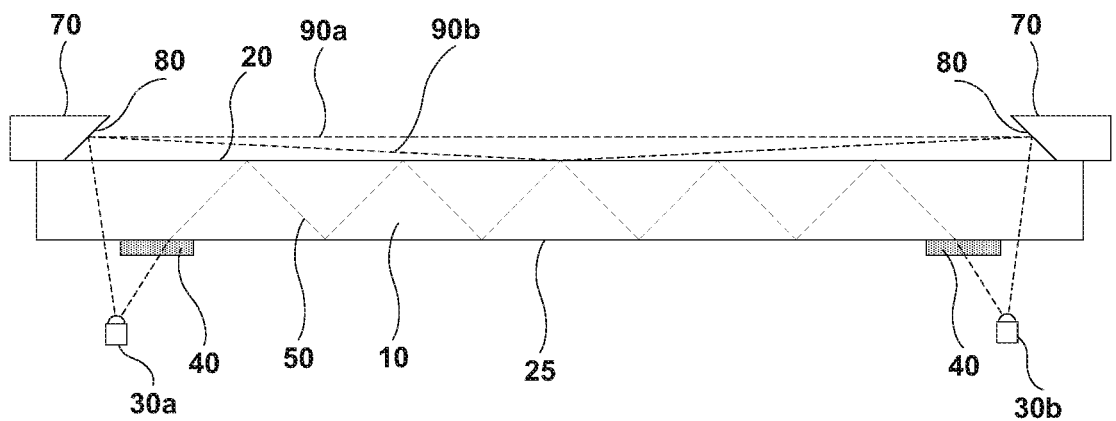
FIG. 9 shows an embodiment of the present invention with deflectors set back from the edge of the active area.

In an embodiment of the invention shown in FIG. 9, edge reflector 70 is set further back from the periphery of touch surface 20 than in the previous embodiments. The positioning of the edge reflector 70 further back from the periphery of touch surface 20 provides a longer distance from emitters 30a to reflector surface 80, allowing the above surface detection lines to be broader. Furthermore, the extra distance that the edge reflector 70 is set back provides larger overlap between wide detection lines 96 in the peripheral regions of touch surface 20 resulting in improved accuracy in areas. This is especially advantageous where narrow detection lines 95 provide limited coverage. In a preferred embodiment, the edge reflector 70 is positioned so that reflector surface 80 is set 10 mm back from in-coupling point 45.

Figure 10:
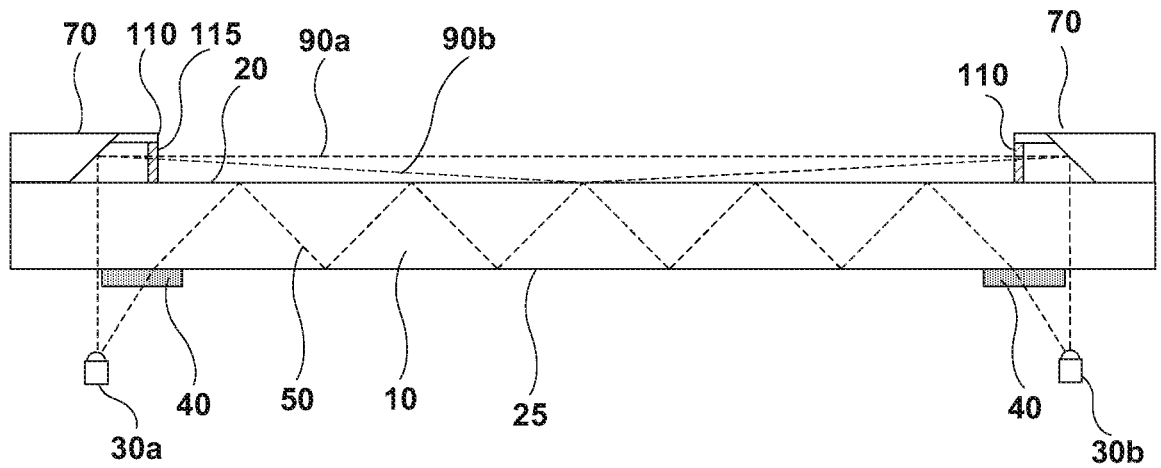
FIG. 10 shows an embodiment of the present invention having a dust shield.

FIG. 10 shows an embodiment of the invention featuring dust shield 110. A known problem with above-surface touch systems is the accumulation of dust and contamination around the sensor area or the area in which the light signal is emitted to travel across the touch panel. Dust or other contamination accumulating at this point will block the light signal and seriously degrade the ability of the touch system to determine a touch. For a system such as the embodiment presented in FIG. 3, the accumulation of contamination may be increased where reflector surface 80 is angled to form an overhang. This overhang forms a natural shelter for accumulating contamination, resulting in further touch signal degradation. A solution presented in FIG. 10 is that of a dust shield 110 forming a physical barrier preventing the dust from reaching reflector surface 80 and comprising transparent window 115 through which the light signal may pass unhindered. Preferably, dust shield 110 forms a sloping edge, sloping from the inside edge in contact with touch surface 20 outwardly to the top surface of edge reflector 70. This allows dust shield 110 to be effectively wiped clean.

In a preferred embodiment, transparent window 115 comprises a material of coating configured to allow only IR or Near-IR light to pass through. This feature provides improved ambient light noise reduction as light from artificial lighting or sun light is filtered before reaching detectors 30b.

In a preferred embodiment, dust shield 110 is configured with a longer dimension extending from edge reflector 70 towards touch surface 20 and with an internal top surface providing a light baffle effect so as to provide an angular filter for light entering through transparent window 115. This is advantageous for reducing ambient noise as light entering at the wrong angle is absorbed into the roof of the dust shield 110. Furthermore, when combined with the embodiment from FIG. 8, the angle of light paths travelling above the panel may be limited so that that detection lines very high above the glass 90a may be supressed.

Figure 11:
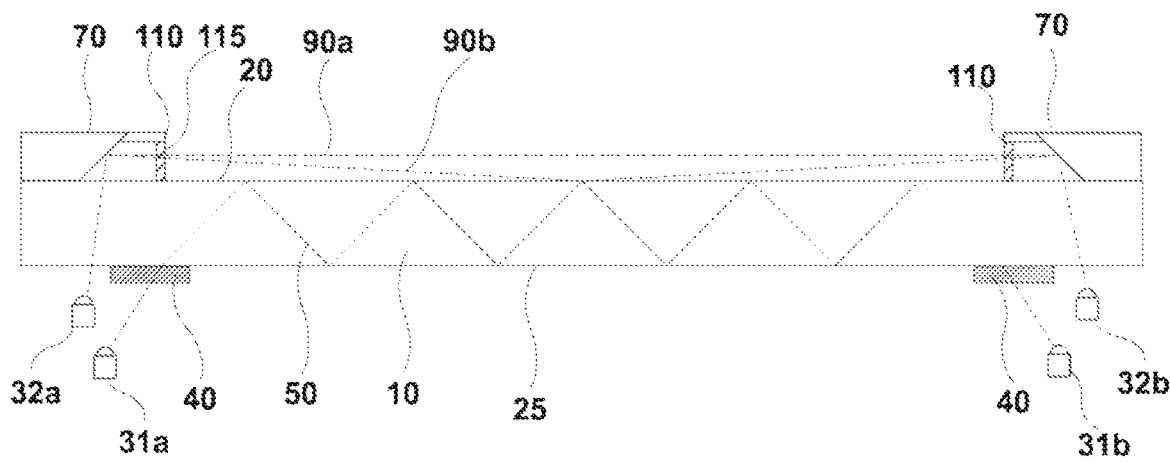
FIG. 11 shows an embodiment of the present invention having a first set of emitters and detectors for projecting light above transmissive panel 10 and a second set of emitters and detectors for projecting light into transmissive panel 10.

FIG. 11 shows an alternative embodiment to the embodiment shown in FIG. 3. In FIG. 11, apparatus 100 is configured to transmit light from a first set of emitters 31a to a first set of detectors 31b inside a transmissive panel 10 so as to illuminate a touch surface 20 from within the transmissive panel 10. Apparatus 100 is also configured to transmit light from a second set of emitters 32a to a second set of detectors 32b such that the light is emitted by emitters 32a, exits transmissive panel 10 through touch surface 20 and is reflected by reflector surface 80 of edge reflector 70 to travel along path 90a in a plane parallel with touch surface 20. The light will then continue until deflected by reflector surface 80 of the edge reflector 70 at an opposing edge of the transmissive panel 10, wherein the light will be deflected back down through transmissive panel 10 and onto detectors 32b. Significant advantages may be obtained from using two separate emitting and detecting systems rather than a single set of emitters and detectors for both the above-surface and FTIR light paths. A significant problem with trying to differentiate between the attenuation of the light travelling along a path above the touch surface from the attenuation of light travelling along a path within the panel via FTIR is that a typical finger touch is likely to produce an attenuation of the light above the panel is greater than the attenuation of the light travelling within the panel via FTIR by as much as a factor of 50. This results in an attenuation signal of the light travelling in the panel which is difficult to differentiate from noise relative to the attenuation signal of the light travelling above the panel. For objects such as stylus tips, this relative difference in signal strength can be even greater. Therefore, the use of separate emitting and detecting systems for light paths above (above-surface system) and within the panel via FTIR (FTIR system) allows each system to be configured appropriately for the respective signal-to-noise ratios. The separate resulting signals can then be combined to provide a system that provides the following features:

Oil or water contamination on the touch surface may appear to the FTIR system as an attenuation surface area and generate a false touch. However, in the above embodiment, the touch output of the FTIR system may be compared to the touch output of the above-surface system to identify touches of the FTIR system which do not appear in the touch output of the above-surface system. This would indicate that the identified touches do not correspond to actual objects above the touch surface but mere contamination on the surface. The output of the identified touches can then be suppressed.

Similarly to the above, when a user raises their finger from the touch surface, a previously identified touch should be removed from the touch output. However, on occasion, finger grease from the skin is left on the touch surface and an FTIR system continues to detect and report a touch. In the above embodiment, the output of the above-surface system may be used to identify touches of the FTIR system where the touching object has now been removed. The output of the identified touches can then be suppressed.

Certain object types produce very little attenuation of the FTIR light when in contact with the touch surface e.g. Hard objects such as stylus tips. Where the above-surface system registers an object but the FTIR system does not, it can be determined that the object is likely to be a 'hard object' as opposed to a normal touch from a finger. Differentiation between hard and soft surfaced objects may allow differentiation between e.g. a pen and a finger. A touch system configured to differentiate between a stylus and a finger tip may generate a different UI output in dependence on the identified object touching the touch surface.

One problem with above-surface systems is that the object touching the touch surface may completely occlude one or more light paths of the above-surface system. Where a large number of touches are simultaneously applied to the touch surface, portions of the touch surface may become significantly shielded from the light paths of the above-surface system, resulting in little or no touch signal in the shielded portion. In the above embodiment, the FTIR may continue to provide a touch signal within the occluded areas, as the attenuation of the FTIR light paths resulting from a touch is relatively small and non-occluding.

In the embodiment of FIG. 11, a first wavelength of light emitted by first set of emitters 31a and detected by first set of detectors 31b may be different to a second wavelength of light emitted by second set of emitters 32a and detected by second set of detectors 32b. This allows light to be emitted from one of the first set of emitters 31a and one of the second set of emitters 32a simultaneously and detected by the first set of detectors 31b and second set of detectors 32b without co-interference. This may also allow improved ambient light noise reduction in environments where ambient light comprises more light with a first wavelength than light with a second wavelength or vice versa. E.g. Wherein the first and second wavelengths are both near IR wavelengths.

In the embodiment of FIG. 11, the timing sequence used to activate emitters of the first and second set of emitters may be chosen to ensure that activation of the emitters of the first set of emitters does not chronologically overlap with activation of the emitters of the second set of emitters. This allows potential co-interference to be minimized.

Figure 12:
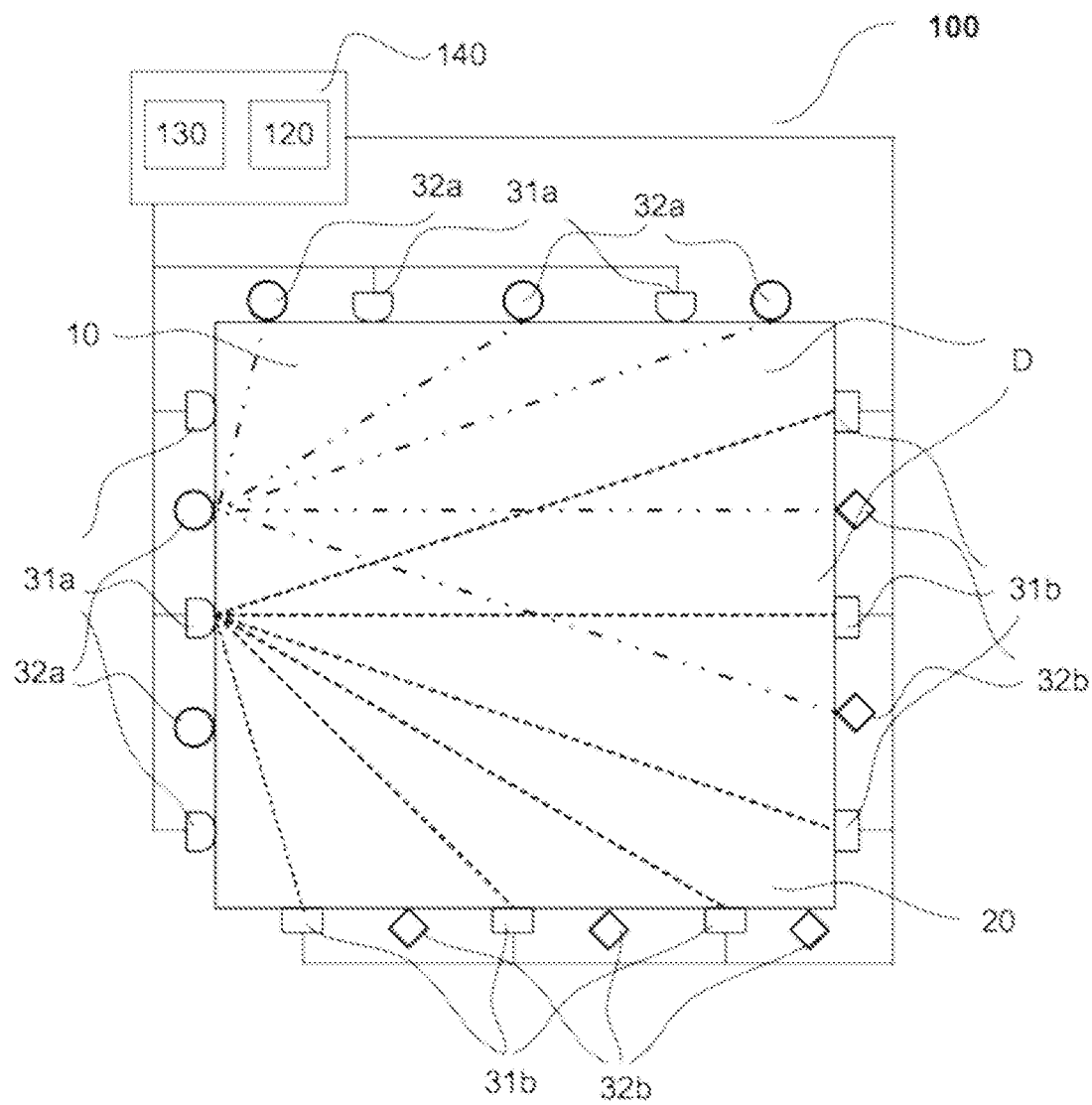
FIG. 12 shows a top plan view of the FIG. 11.

FIG. 12 shows a top plan view of the FIG. 11. In this embodiment, emitters 31a are spatially interlaced with emitters 32a around the peripheral edge of transmissive panel 10 so that emitters of first set 31a are positioned between adjacent emitters of second set 32a. Similarly, detectors 31b are spatially interlaced with detectors 32b around the peripheral edge of transmissive panel 10 so that detectors of first set 31b are positioned between adjacent emitters of second set 32b. This has the advantage of improving coverage of the touch surface where detection paths of the above-surface system cover gaps between detection paths of the FTIR system and vice versa.

In one embodiment, emitters 31a and detectors 31b are only positioned along sub-portions of the periphery of the touch surface. In this embodiment, the portion of the periphery of the touch surface along which emitters 31a and detectors 31b are positioned is smaller than the portion of the periphery of the touch surface along which emitters 31a and detectors 31b are positioned. In one example, emitters 31a and detectors 31b are only located along two opposing edges of a rectangular touch surface. In an alternative embodiment, emitters 31a are placed along one edge of the rectangular touch surface and detectors 31b are positioned along an opposing edge of the touch surface. Alternatively, emitters 31a and detectors 31b may be positioned along L-shaped portions of the periphery of the rectangular touch surface at the corners. In one embodiment, the number of emitters 31a and detectors 31b are fewer than the number of emitters 32a and detectors 32b respectively. This may result in an FTIR system with a lower resolution than the above-surface system. Alternatively, for all of the above arrangements, emitters 31a and detectors 31b may be swapped for emitters 32a and detectors 32b so that the FTIR system has a higher resolution and/or coverage than the above-surface system. These arrangements allow the advantages of a complete above-surface system or FTIR system to be supplemented with the advantages of a limited FTIR system or limited above-surface system respectively without the need for a complete version of both systems. This would allow a significant reduction in manufacturing cost, power usage, and even physical size of the touch frame. E.g. Where high accuracy pressure detection needed to be added to an above-surface system, a limited FTIR type system configured to detect pressure (as is known in the art) may be added to the above-surface system with only as many emitters and detectors needed to accurately detect pressure. In one example, the limited system comprises only 25% of the number of emitters and detectors of the complete system.

In one embodiment, a low-power mode is provided wherein only the above-surface system is powered. When a touch is detected by the above-surface system, a full-power mode is activated and power is provided to the FTIR system. This has the advantage of preserving energy during periods that the above-surface system detects no touches whilst enabling the features of the FTIR system once it is required. Alternatively, an embodiment is provided wherein only the FTIR system is powered in a low-power mode and the above-surface system is only powered on when required. This may include a system wherein the above-surface system is only activated periodically or in response to a determination that a touch detected by the FTIR system is possibly a false touch caused by contamination.

Figure 13:
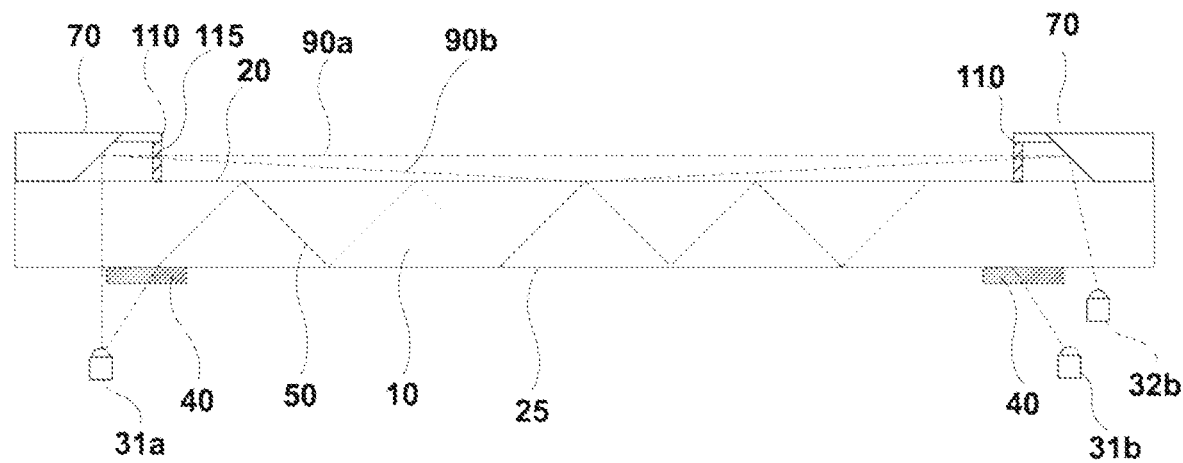
FIG. 13 shows a variation of FIG. 11 wherein the emitters are configured to simultaneously project light above and into transmissive panel 10.

FIG. 13 shows a variation of FIG. 11 wherein emitters 31a are configured to simultaneously project light above and into transmissive panel 10 but wherein separate detectors 31b and 32b are used to provide separate above-surface and FTIR type touch signals. This advantageously allows simultaneous emission of both signals using a single emitter, allowing low energy consumption and cheaper manufacturing costs, whilst the above features.

Figure 14:
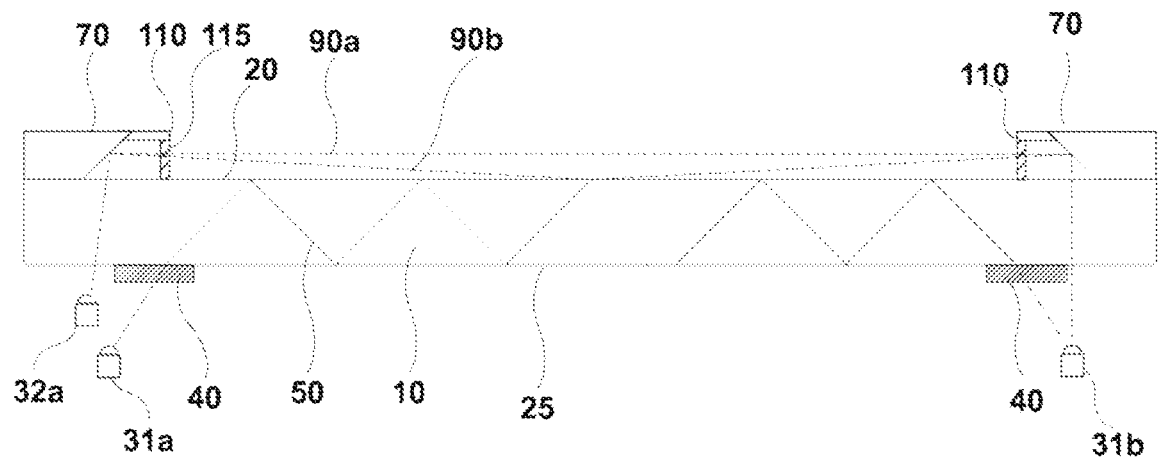
FIG. 14 shows a variation of FIG. 11 wherein the detectors are configured to simultaneously receive light from above and from within transmissive panel 10.

FIG. 14 shows an alternative to FIG. 13 wherein the detectors 31b are configured to simultaneously receive light from above and from within transmissive panel 10 but wherein separate emitters 31a and 32a are used to provide separate above-surface and FTIR type touch signals. This configuration advantageously allows separate control of the light intensity of the light emitted from emitters 31a and 32a to account for environmental light noise or other situations in which light levels need to be separately altered, whilst also allowing low energy consumption and cheaper manufacturing costs.

For all of the above embodiments, alternative in-coupling and out-coupling solutions used for coupling the light into and out of transmissive panel 10 may be employed according to techniques known in the prior art. E.g. Coupling the light into the edge of the panel rather than from below.

Furthermore, alternative waveguide, lens, and reflective surface configurations to convey light from emitters 32a to a plane parallel with touch surface 20 and back to detectors 32b may be employed according to techniques known in the prior art. E.g. Configurations for conveying the light around the edge of the panel rather than through it.

REFERENCE SIGNS LIST

A. touch-sensitive apparatus 100
B. transmissive panel 10
C. touch surface 20
D. bottom surface 25
E. emitters 30*a*
F. detectors 30*b*
G. coupling element 40
H. in-coupling point 45
I. light beam 50
J. touching object 60
K. edge reflector 70
L. reflector surface 80
M. reflector surface focal point 80*a*
N. light beam 90
O. path 90*a*
P. path 90*b*
Q. path 90*c*
R. detection lines 95
S. detection lines 96
T. dust shield 110
U. transparent window 115
V. light paths D
W. controller 120
X. signal processor 130
Y. processing unit 140
Z. signal profile 150
AA. signal profile 160

The invention claimed is:

1. A touch sensing apparatus, comprising:
a light transmissive element that defines a touch surface;
a first set of emitters arranged around a first portion of a periphery of the touch surface, the first set of emitters configured to emit first beams of light into the light transmissive element, wherein the first beams of light propagate inside the light transmissive element while illuminating the touch surface;
a second set of emitters arranged around a second portion of the periphery of the touch surface, the second set of emitters configured to emit second beams of light, wherein the second beams of light are reflected to travel above the touch surface;
a first set of light detectors arranged around a third portion of the periphery of the touch surface, the first set of light detectors configured to receive light from the first set of emitters from the transmissive element;
a second set of light detectors arranged around a fourth portion of the periphery of the touch surface, the second set of light detectors configured to receive light from the second set of emitters from above the touch surface, and
a diffusive reflecting surface arranged around the first and the second portions of the periphery of the touch surface to direct light from the first and the second set of emitters across the touch surface, wherein the diffusive reflecting surface provides a scattering of greater than 90% and wherein the diffusive reflecting surface is arranged a greater distance from the periphery of the touch surface in the plane of the touch surface than emitters;
wherein each light detector in the first set of light detectors is arranged to receive light from more than one emitter in the first set of emitters;
a processor configured to determine, based on output signals of the first and second set of light detectors, the position of an object on the touch surface.

2. The touch sensing apparatus of claim 1, wherein the first and second set of emitters comprise at least one common emitter.

3. The touch sensing apparatus of claim 1, wherein the first and second set of detectors comprise at least one common detector.

4. The touch sensing system of claim 1 wherein the processor is configured to perform a first touch determination based on signals of the first set of light detectors and a second touch determination based on signals of the second set of light detectors, and wherein the position of an object on the touch surface is determined in dependence on the first touch determination and second touch determination.

5. The touch sensing system of claim 4, wherein the processor is configured to determine that the object is not touching the touch surface when the first touch determination indicates the presence of the object but the second touch determination indicates the absence of the object.

6. The touch sensing system of claim 4, wherein the processor is configured to determine that the object is of a first object type when the first touch determination indicates the absence of the object but the second touch determination indicates the presence of the object.

7. The touch sensing system of claim 4, wherein the processor is configured to determine the position of an object on the touch surface in dependence on just the first touch determination when the object is occluded from the second beams of light.

8. The touch sensing system of claim 1 wherein the first set of emitters is configured to emit light at a first wavelength and the first set of detectors is configured to detect light at the first wavelength, and wherein the second set of emitters is configured to emit light at a second wavelength and the second set of detectors is configured to detect light at the second wavelength.

9. The touch sensing system of claim 1 wherein the touch sensing system is configured to activate the first set of emitters and the second set of emitters at non-overlapping times.

10. The touch sensing apparatus of claim 1, wherein the touch sensing system is configured to operate in a low-power mode wherein just the second set of emitters are powered, and wherein when the processor determines the presence of an object on the touch surface from the second set of light detectors, entering a higher-power mode wherein the first and second set of emitters are powered.

11. The touch sensing apparatus of claim 1, wherein the touch sensing system is configured to operate in a low-power mode wherein just the first set of emitters are powered, and wherein when the processor determines the presence of an object on the touch surface from the first set of light detectors, entering a higher-power mode wherein the first set of emitters are powered and the second set of emitters are at least intermittently powered.

12. The touch sensing apparatus of claim 1, wherein the first and/or third portion is larger than the second and/or fourth portion.

13. The touch sensing apparatus of claim 1, wherein the number of the first set of emitters and/or first set of detectors is larger than the number of the second set of emitters and/or second set of detectors.

14. The touch sensing apparatus of claim 13, wherein the ratio of the first set of emitters and/or first set of detectors to the number of the second set of emitters and/or second set of detectors is 4:1.

15. The touch sensing apparatus of claim 1, wherein the first and second set of emitters are spatially interleaved along the periphery of the touch surface.

16. A touch sensing apparatus, comprising:
a touch surface;
a set of emitters arranged around a portion of the periphery of the touch surface to emit beams of light;
a diffusive reflecting surface arranged around a portion of the periphery of the touch surface to direct light from the set of emitters across the touch surface, wherein the diffusive reflecting surface provides a scattering of greater than 90% and wherein the diffusive reflecting surface is arranged a greater distance from the periphery of the touch surface in the plane of the touch surface than emitters; and
a set of light detectors arranged around a portion of the periphery of the touch surface to receive light from the set of emitters, wherein each light detector is arranged to receive light from more than one emitter.

17. The touch sensing apparatus of claim 16, wherein the diffusive reflecting surface is a Lambertian diffusive reflecting surface.

18. The touch sensing apparatus of claim 16, wherein the diffusive reflecting surface comprises a titanium oxide layer.

19. The touch sensing apparatus of claim 16, wherein the diffusive reflecting surface comprises a microcellular foamed reflector, wherein the touch surface comprises a transparent panel, and wherein the light from the emitters is transmitted to diffusive reflecting surface through a transmissive panel.

* * * * *